No. 708,503. Patented Sept. 2, 1902.
M. L. STONE.
COOKING OR HEATING OIL STOVE.
(Application filed Apr. 23, 1902.)
(No Model.)

Witnesses.
L. Trimble
L. C. Reynolds

Inventor:
M. L. Stone

UNITED STATES PATENT OFFICE.

MARIE LOUISE STONE, OF TORONTO, CANADA.

COOKING OR HEATING OIL-STOVE.

SPECIFICATION forming part of Letters Patent No. 708,503, dated September 2, 1902.

Application filed April 23, 1902. Serial No. 104,390. (No model.)

*To all whom it may concern:*

Be it known that I, MARIE LOUISE STONE, of the city of Toronto, in the county of York, in the Province of Ontario, Canada, have invented certain new and useful Improvements in Cooking or Heating Oil-Stoves, of which the following is a specification.

My invention relates to improvements in cooking and heating oil-stoves; and the object of the invention is to devise a simple stove of this class by which a maximum amount of heat for a given size of stove and flame may be produced either for heating or cooking purposes; and it consists, essentially, of a bowl preferably cylindrical and supported on a suitable base and provided at the top with burners, a disk provided with double truncated-cone thimbles extending therethrough and perforations in the disk outside of the thimbles, and a reversely-set truncated-cone-shape flue supported on the burners at the bottom and encompassing the bottom of the thimbles at the top, so as to support the disk, a radiating-cylinder suitably fitted onto a rim on the disk and suitably perforated, and truncated-cone-shape extension-flues fitted onto the top portions of the thimbles, the parts being otherwise arranged and constructed in detail as hereinafter more particularly explained.

Figure 1:
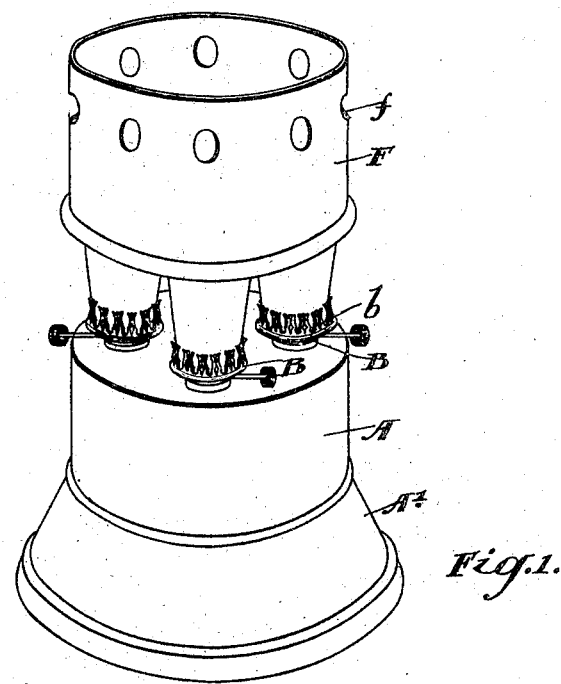
Figure 3:
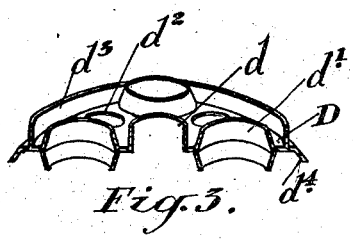
Figure 2:
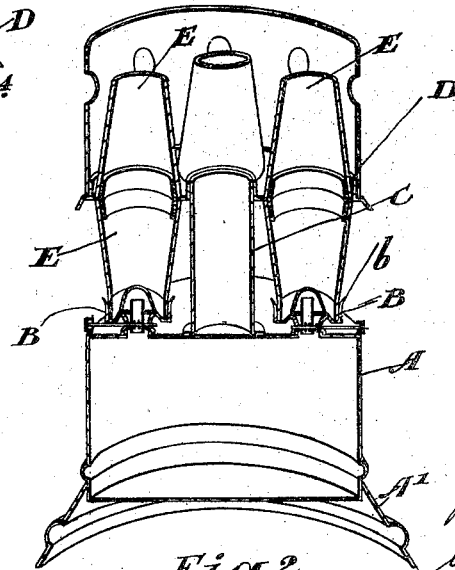

Figure 1 is a perspective view of a stove constructed in accordance with my invention. Fig. 2 is a vertical section through the stove. Fig. 3 is a detail of the disk.

In the drawings like letters of reference indicate corresponding parts in each figure.

A is the oil-bowl, which is supported on a suitable base A' and provided with a plurality of burners B—four in this instance—which are provided with the ordinary holdfast-clips $b$.

C is a central guide, which is suitably soldered to the center of the bowl, which is flat at the top.

D is a disk, which is provided with a central ring $d$, suitably soldered or otherwise fastened to the same, so as to leave a central opening. The said ring is designed to fit down over the guide C, so as to always center the disk and the radiator supported thereby.

$d'$ represents suitable double truncated-cone-shape thimbles which extend half above and half below the disk, and $d^2$ represents perforations made in the disk.

$d^3$ is the upwardly-extending rim of the disk, and $d^4$ is the downwardly-extending inclined deflecting-flange.

E represents a series of reversely-set truncated-cone-shape flues, which fit within the clips $b$ and at the top surround the lower portion of the thimbles $d'$ and support the disk D.

E' represents truncated-cone-shape extension-flues which are fitted over the upper half of the thimbles $d'$.

F is the radiator, which is provided with a series of perforations $f$ either at the top or at the bottom, as may be desired. In the case of cooking it would be better, possibly, to have them at the bottom. In the case of cooking, also a rim or cover would be placed on top of the radiator F in order to strengthen the same, and an oven or any other utensil may be placed on top, so as to get the benefit of the heat.

Having now described the principal parts involved in my invention, I shall briefly describe its utility. The products of combustion are generated by the burners and carried up through the double truncated flue into the radiator F, where they act at the bottom of a utensil or radiate from such radiator out through the openings. The perforations in the disk D serve to create an upward draft through the radiator, and thereby draw the cold air from the floor when such stove is placed on the floor. My stove is designed to be placed on the floor or table. The perforations in the plate also serve to supply oxygen at the top of the flues, thereby creating the greatest heat at the point where most required.

In case it is desired to use my stove for heating it will of course be understood that any suitable cover may be placed on the top of the radiator, and such cover may be perforated or devoid of perforations. It will also be understood that there may be any number of perforations or rows of perforations made in the wall of the radiator.

What I claim as my invention is—

1. In a cooking and heating oil-stove, the combination with the oil-bowl and the burners extending upwardly from the same, of the disk provided with double truncated-coneshape flues, the lower one being reversely set to the upper one and at the bottom fitting the burner as and for the purpose specified.

2. In a cooking or heating oil-stove, the combination with the oil-bowl and the burners extending upwardly from the same, of the disk provided with double truncated-cone-shape flues, the lower one being reversely set to the upper one and at the bottom fitting the burner, a central opening in the disk and a central guide affixed to the center of the top of the bowl and designed to extend up through the central opening or hole in the disk as and for the purpose specified.

3. In a cooking or heating oil-stove, the combination with the oil-bowl and the burners extending upwardly from the same, of the disk provided with double truncated-cone-shape flues, the lower one being reversely set to the upper one and at the bottom fitting the burner, and a radiator-wall suitably secured at the lower edge to and above the edge of the disk as and for the purpose specified.

4. In a cooking and heating oil-stove, the combination with the bowl, the burners located in the top of the same, the disk provided with upwardly-extending rim, and the radiator fitting such rim, of the thimbles suitably secured and extending through the disk and the reversely-set truncated cone fitting at the bottom on the burner and at the top around the lower half of the thimble, so as to support the same and the truncated cone fitting the upper half of the thimbles above the disk and forming with the lower truncated cone a plurality of flues as and for the purpose specified.

5. In a cooking and heating oil-stove, the combination with the bowl, the burners located in the top of the same, the disk provided with an upwardly-extending rim and perforated as shown, and the radiator-wall fitting such rim, of the thimbles suitably secured and extending through the disk and the reversely-set truncated cones fitting at the bottom on the burners and at the top around the lower half of the thimbles, so as to support the same and the truncated cones fitting the upper half of the thimbles above the disk and forming with the lower truncated cones a plurality of flues as and for the purpose specified.

MARIE LOUISE STONE.

Witnesses:
B. BOYD,
R. SHIELDS.